United States Patent [19]
Coffinberry et al.

[11] Patent Number: 5,918,458
[45] Date of Patent: Jul. 6, 1999

[54] SYSTEM AND METHOD OF PROVIDING CLEAN FILTERED COOLING AIR TO A HOT PORTION OF A GAS TURBINE ENGINE

[75] Inventors: George A. Coffinberry, West Chester; Gary L. Leonard, Cincinnati, both of Ohio

[73] Assignee: General Electric Company, Cincinnati, Ohio

[21] Appl. No.: 08/800,491

[22] Filed: Feb. 14, 1997

[51] Int. Cl.$^6$ ............................................ F02C 7/18
[52] U.S. Cl. ......................... 60/39.07; 60/39.75; 62/402
[58] Field of Search ............... 60/39.07, 39.75, 60/228, 39.092, 226.1; 62/402, 87

[56] References Cited

U.S. PATENT DOCUMENTS

| | | | |
|---|---|---|---|
| 3,449,891 | 6/1969 | Shohet et al. | 60/39.092 |
| 3,826,084 | 7/1974 | Branstrom et al. | 60/39.75 |
| 4,896,510 | 1/1990 | Foltz | 60/757 |
| 4,962,640 | 10/1990 | Tobery | 60/39.75 |
| 5,148,669 | 9/1992 | Sellakumar | 60/39.092 |
| 5,151,022 | 9/1992 | Emerson et al. | 423/245.3 |
| 5,174,105 | 12/1992 | Hines | 60/39.07 |
| 5,327,744 | 7/1994 | Frawley et al. | 62/402 |
| 5,392,614 | 2/1995 | Coffinberry | 62/402 |
| 5,468,123 | 11/1995 | Guimier et al. | 60/39.75 |
| 5,622,044 | 4/1997 | Bronicki et al. | 60/728 |

FOREIGN PATENT DOCUMENTS

| | | | |
|---|---|---|---|
| 0267326 | 11/1990 | Japan | 60/39.092 |

*Primary Examiner*—Timothy S. Thorpe
*Assistant Examiner*—Ted Kim
*Attorney, Agent, or Firm*—Andrew C. Hess; Nathan D. Herkamp

[57] ABSTRACT

A system and method for providing clean cooling air to a hot portion of a gas turbine engine is disclosed, where the engine includes a compressor. The system includes a turbocompressor (66) having a compressor section and a turbine section, wherein the compressor and turbine sections each have an inlet and an outlet. The system further includes a heat exchanger (64) having a first inlet and a first outlet for a first fluid flow providing cooling to the heat exchanger, the first inlet being in fluid communication with a low temperature fluid. The heat exchanger (64) also has a second inlet and a second outlet for a second air flow receiving cooling from the heat exchanger, the second inlet being in fluid communication with high temperature air from the engine compressor and the second outlet being in fluid communication with the inlet of the compressor section of the turbocompressor. The outlet of the compressor section of the turbocompressor is in fluid communication with the filter inlet and the outlet of the filter (72) is in fluid communication with the engine hot portion so that clean cooling air is supplied to the engine hot portion.

7 Claims, 2 Drawing Sheets

SYSTEM AND METHOD OF PROVIDING CLEAN FILTERED COOLING AIR TO A HOT PORTION OF A GAS TURBINE ENGINE

BACKGROUND OF THE INVENTION

1. Field of the Invention

The present invention relates generally to a cooling system and method for a gas turbine engine and, in particular, to a system and method of providing clean cooling air to a hot portion of a gas turbine engine.

2. Description of Related Art

Gas turbine engines (such as turbojet engines, bypass turbofan engines, turboprop engines, turboshaft engines, etc.) may be used to power flight vehicles (such as planes, helicopters, and missiles, etc.) and may also be used to power ships tanks, electric power generators, pipeline pumping apparatus, etc. For purposes of illustration, the present invention will be described with respect to an aircraft bypass turbofan gas turbine engine. However, it is understood that the invention is equally applicable to other types and/or uses of gas turbine engines.

A gas turbine engine includes a core engine having, in serial flow relationship, a high pressure compressor (also called a core compressor) to compress the airflow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical aircraft bypass gas turbine engine adds a low pressure turbine (located aft of the high pressure turbine) which is connected by a smaller diameter coaxial shaft to drive a front fan (located forward of the high pressure compressor) which is surrounded by a nacelle and which may also drive a low pressure compressor (located between the front fan and the high pressure compressor). The low pressure compressor sometimes is called a booster compressor or simply a booster. It is understood that the term "compressor" includes, without limitation, high pressure compressors and low pressure compressors. A flow splitter, located between the fan and the first (usually the low pressure) compressor, separates the air which exits the fan into a core engine airflow and a surrounding bypass airflow. The bypass airflow from the fan exits the fan bypass duct to provide most of the engine thrust for the aircraft. Some of the engine thrust comes from the core engine airflow after it flows through the low and high pressure compressors to the combustor and is expanded through the high and low pressure turbines and accelerated out of the exhaust nozzle.

Aircraft bypass turbofan gas turbine engines are designed to operate at high temperatures to maximize engine thrust. Cooling of engine hot section components (such as the combustor, the high pressure turbine, the low pressure turbine, and the like) is necessary because of the thermal "redline" limitations of the materials used in the construction of such components. Typically, such cooling of a portion of the engine is accomplished by ducting (also called "bleeding") cooler air from the high and/or low pressure compressors to those engine components which require such cooling. Unfortunately, the relatively low pressure and hot temperature of the compressor air limits its ability to be used to cool such engine components.

In order to improve cooling of the hot section components and other portions of a gas turbine engine, a gas turbine engine cooling system disclosed by U.S. Pat. No. 5,392,614 was developed which includes a turbocompressor and a heat exchanger. As seen therein, this system provides air having a higher pressure and a lower temperature for cooling portions of the engine, such as hot section components.

One manner of cooling a hot object is by means of transpiration cooling, where cooling air is passed through a porous surface in order to provide a continuous sheet of air insulation on the hot side of the surface. This type of cooling in a gas turbine engine has heretofore been impossible to use because of dirt and other contaminants in the cooling air which would plug the tiny cooling holes (on the order of $1/1000$ of an inch versus holes having a range of $10-15/1000$ of an inch). To the extent the cooling air might have been filtered, this has been made impractical due to the pressure loss resulting therefrom. This problem of contaminants in the cooling air is also applicable to film cooling, as the holes utilized therefor must remain large enough to permit dirty cooling air to pass therethrough.

Accordingly, it is desired that a system for a gas turbine engine be developed which enables cooling air to be filtered without experiencing a net pressure loss.

SUMMARY OF THE INVENTION

In accordance with one aspect of the present invention, a system for providing clean cooling air to a hot portion of a gas turbine engine is disclosed, where the engine includes a compressor. The system includes a turbocompressor having a compressor section and a turbine section, wherein the compressor and turbine sections each have an inlet and an outlet. A filter having an inlet and an outlet is provided for separating contaminants from air supplied to the inlet thereof so that clean cooling air is supplied from the filter outlet. The system further includes a heat exchanger having a first inlet and a first outlet for a first fluid flow providing cooling to the heat exchanger, the first inlet being in fluid communication with a low temperature fluid. The heat exchanger also has a second inlet and a second outlet for a second air flow receiving cooling from the heat exchanger, the second inlet being in fluid communication with high temperature air from the engine compressor and the second outlet being in fluid communication with the inlet of the compressor section of the turbocompressor. The outlet of the compressor section of the turbocompressor is in fluid communication with the filter inlet and the outlet of the filter is in fluid communication with the engine hot portion so that clean cooling air is supplied to the engine hot portion.

In accordance with a second aspect of the invention, a method for providing clean cooling air to a hot portion of a gas turbine engine is disclosed. The method includes the steps of bleeding an air flow from a compressor of the engine, cooling the air flow, increasing the pressure of the air flow, filtering the air flow to remove contaminants, and providing clean cooling air to the engine hot portion. The cooling step is performed by providing the air flow to a heat exchanger and the pressure increasing step is performed by providing the air flow to a compressor section of a turbocompressor.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
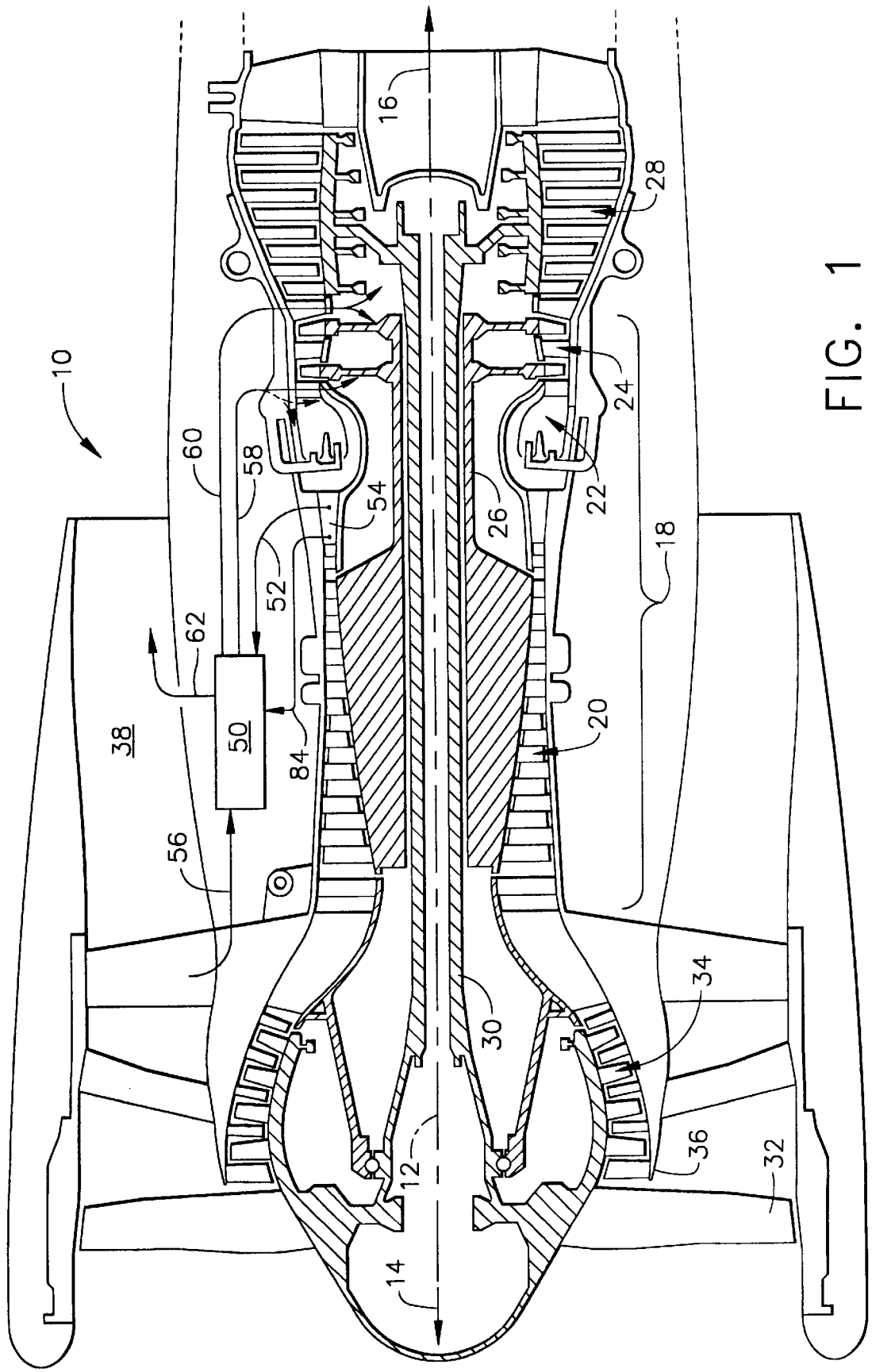
FIG. 1 is a schematic side view of an aircraft bypass turbofan gas turbine engine (with the exhaust nozzle omitted for clarity) which employs the system of the present invention.

Referring now to the drawing in detail, wherein identical numerals indicate the same elements throughout the figures, FIG. 1 depicts an aircraft bypass turbofan gas turbine engine 10 having a generally longitudinally extending axis or centerline 12 generally extending forward 14 and aft 16. Bypass turbofan engine 10 includes a core engine (also called a gas generator) 18 which comprises a high pressure compressor or core compressor 20, a combustor 22, and a high pressure turbine 24, all arranged in a serial, axial flow relationship. A larger diameter annular drive shaft 26, disposed coaxially about centerline 12 of engine 10, fixedly interconnects high pressure compressor 20 and high pressure turbine 24.

Core engine 18 is effective for generating combustion gases. Pressurized air from high pressure compressor 20 is mixed with fuel in combustor 22 and ignited, thereby generating combustion gases. Some work is extracted from these gases by high pressure turbine 24 which drives high pressure compressor 20. The combustion gases are discharged from core engine 18 into a low pressure or power turbine 28. Low pressure turbine 28 is fixedly attached to a smaller diameter annular drive shaft 30 which is disposed coaxially about centerline 12 of engine 10 within larger diameter annular drive shaft 26. Smaller diameter annular drive shaft 30 rotates a forward row of fan rotor blades 32. Smaller diameter annular drive shaft 30 also rotates a low pressure compressor 34 (also called a booster compressor or simply a booster). A flow splitter 36, located between fan blades 32 and low pressure compressor 34, separates the air which exits the fan into a core engine airflow which exits the exhaust nozzle (not shown) and a surrounding bypass airflow which exits fan bypass duct 38.

FIG. 1 shows generally a system 50 of the present invention and a first application thereof for providing clean cooling air to a hot portion of engine 10, where the hot portion is shown as being high pressure turbine 24. It will be understood that the hot portion to which clean cooling air is supplied may be any part of engine 10 (particularly one in which film cooling is difficult to achieve), and includes but is not limited to the nozzles of high pressure turbine 24 and walls of combustor 22. In its essence, system 50 receives air from a discharge region of either high pressure compressor 20 or low pressure compressor 34, cools such compressor discharge air, increases the pressure of the cooled air, filters contaminants out of the air, and then discharges the clean cooling air to the designated hot portion of engine 10.

Figure 2:
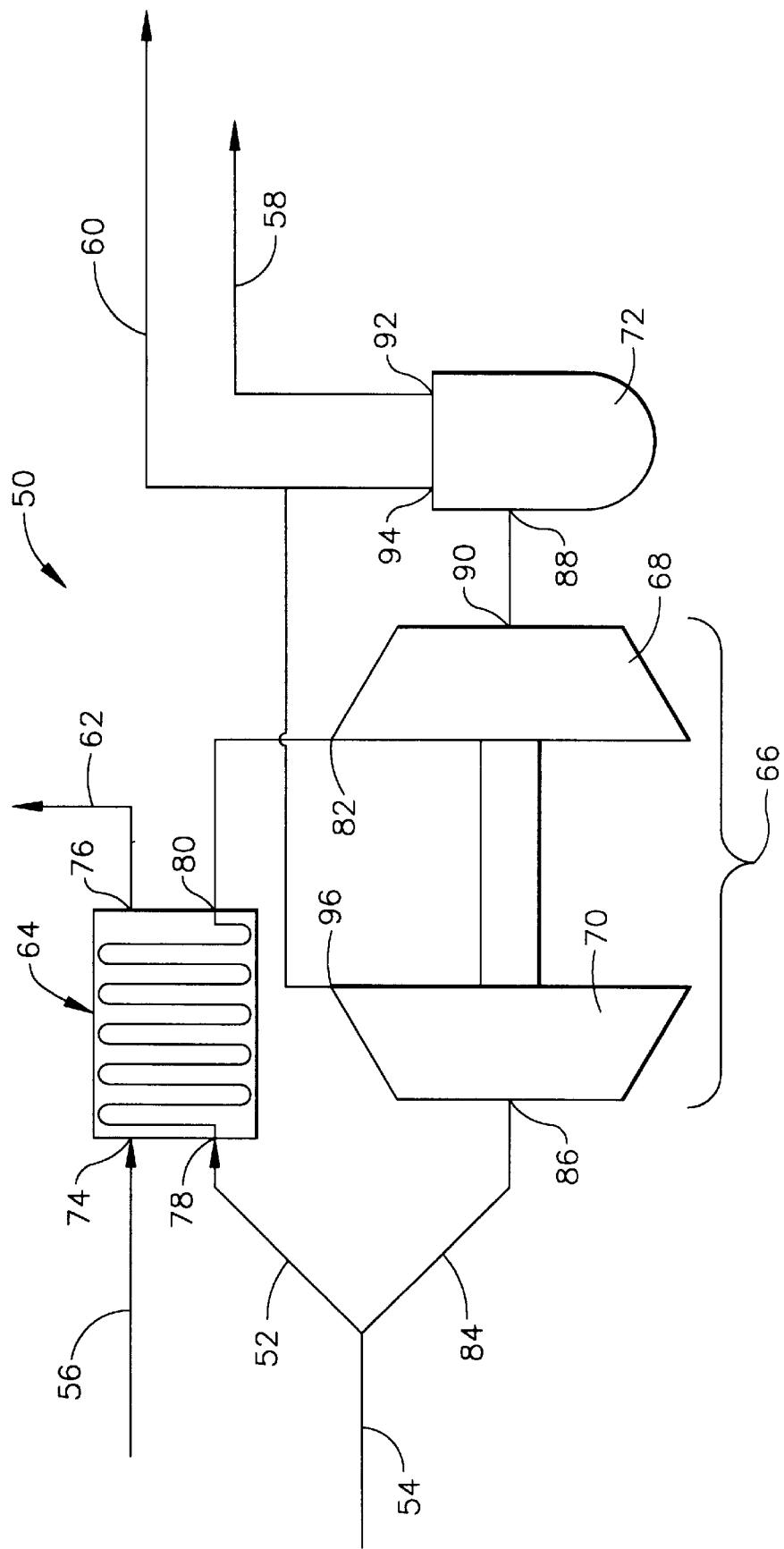
FIG. 2 is a block diagram of the system depicted in FIG. 1.

As more specifically seen in FIG. 2, system 50 includes a heat exchanger 64 to cool the air received (preferably from a discharge region 54 of high pressure compressor 20 since it will have a higher pressure), a turbocompressor 66 having a compressor section 68 and a turbine section 70 to increase the pressure of such compressor discharge air after it has been cooled, and a filter 72 to separate contaminants (e.g., particles, dirt, and other debris) from the air. Heat exchanger 64 has a first inlet 74 which is in fluid communication with a fluid flow having a relatively low temperature. While a duct 56 is shown as providing fan air as the cooling medium (preferably by means of a scoop located on the wall of fan bypass duct 38), it may also be provided from other sources (e.g., a fuel line connected to a fuel supply of engine 10). The fan air then exits heat exchanger 64 through a first outlet 76 back into fan bypass duct 38 through a duct 62 for discharge. Compressor discharge air enters heat exchanger 64 through a second inlet 78 which is in fluid communication with duct 52. It will be understood that the compressor discharge air has a higher temperature than the cooling medium supplied to heat exchanger 64 (i.e., the fan air or fuel) and is therefore cooled thereby before exiting a second outlet 80 of heat exchanger 64.

After cooling the compressor discharge air via heat exchanger 64, the pressure of such air is increased in an amount great enough to at least offset any pressure loss stemming from the filtering performed downstream. Accordingly, second outlet 80 of heat exchanger 64 is connected to an inlet 82 of compressor section 68 in turbocompressor 66 so that the cooled compressor discharge air is compressed therein. It will be noted that a duct 84 also provides air from compressor discharge region 54 of high pressure compressor 20 to an inlet 86 of turbine section 70 of turbocompressor 66, thereby providing the drive air necessary to permit the compression of the cooled compressor discharge air in compressor section 68.

After increasing the pressure of the cooled compressor discharge air by compressor section 68, it enters an inlet 88 of filter 72 since an outlet 90 of compressor section 68 is in fluid communication therewith. Filter 72 functions to separate contaminants from the air provided thereto so as to provide a supply of clean cooling air from an outlet thereof. While filter 72 may be any type suitable for the desired function, it is preferred that filter 72 be a cyclonic or centrifugal filter. Accordingly, filter 72 will include a first outlet 92 for supplying the clean cooling air and a second outlet 94 for supplying dirty air.

It will then be seen from FIG. 2 that first outlet 92 of filter 72 is connected in fluid communication with a duct 58 to provide the clean cooling air to high pressure turbine 24, although it may alternatively be provided to any hot portion of engine 10 for transpiration and/or film cooling. Second outlet 94 of filter 72 is connected in fluid communication with a duct 60 in order to utilize the dirty air as drive air in low pressure turbine 28 and thereby permit such dirty air to exit engine 10. In the same manner, the high pressure compressor discharge air provided to turbine section 70 of turbocompressor 66 via duct 84 preferably is directed to low pressure turbine 28 by placing an outlet 96 of turbine section 70 in fluid communication with duct 60.

Through the system and method of the present invention, clean cooling air may be provided to a hot portion of engine 10 and be utilized for transpiration cooling such hot portion. This is because the clean cooling air provided will not plug the relatively tiny holes in the porous structure utilized for such cooling and the pressure of such air is maintained high enough so as to be effective for such purpose. Alternatively, such clean cooling air may be used for film cooling a hot portion of engine 10 and correspondingly permit the holes thereof to be smaller in diameter. Having shown and described the preferred embodiment of the present invention, further adaptations of the system and method of providing clean cooling air to a hot portion of an engine can be accomplished by appropriate modifications by one of ordinary skill in the art without departing from the scope of the invention.

What is claimed is:

1. A system for providing clean cooling air to a hot portion of a gas turbine engine, said engine including a compressor, said system comprising:

(a) a turbocompressor having a compressor section and a turbine section, wherein said compressor and turbine sections each include an inlet and an outlet;

(b) a cyclonic filter for separating contaminants from cooling air supplied to an inlet thereof, said filter including a first outlet for supplying said clean cooling air and a second outlet for supplying dirty air containing said filtered contaminants; and (c) a heat exchanger, comprising:
  (1) a first inlet and a first outlet for a first fluid flow providing cooling to said heat exchanger, said first inlet being in fluid communication with a low temperature fluid; and
  (2) a second inlet and a second outlet for a second air flow receiving cooling from said heat exchanger said second inlet being in fluid communication with high temperature air from said engine compressor and said second outlet being in fluid communication with said inlet of said compressor section of said turbocompressor;

wherein said outlet of said compressor section of said turbocompressor is in fluid communication with said filter inlet and said first outlet of said filter is in fluid communication with said engine hot portion.

2. The system of claim 1, wherein high temperature air from said engine compressor is also provided to said inlet of said turbine section of said turbocompressor, said turbine section outlet being in fluid communication with said second outlet of said filter.

3. The system of claim 2, wherein said low temperature fluid is air provided from a fan bypass duct of said engine.

4. The system of claim 3, wherein said fan air exits said first outlet of said heat exchanger.

5. The system of claim 2, wherein said engine hot portion is in a high pressure turbine of said engine.

6. The system of claim 5, wherein said engine hot portion is a nozzle in said high pressure turbine.

7. The system of claim 2, wherein said engine hot portion is in a combustor of said engine.

* * * * *